United States Patent Office 2,734,040
Patented Feb. 7, 1956

2,734,040

POLYMERIC COMPOSITIONS COMPRISING A GRAFT ACRYLONITRILE COPOLYMER DISSOLVED IN A MIXTURE OF ETHYLENE CARBONATE AND WATER

Evan Islwyn Jones, Stanley Minor Todd, and Leonard Wood, Manchester, England, assignors to Imperial Chemical Industries Limited, London, England, a corporation of Great Britain No Drawing. Application March 9, 1953,
Serial No. 341,336

Claims priority, application Great Britain March 19, 1952

10 Claims. (Cl. 260—29.6)

This invention relates to new and improved compositions comprising grafted acrylonitrile polymers.

By the term "grafted acrylonitrile polymer" we mean a polymer obtained by polymerising acrylonitrile alone or in the presence of a minor amount of one or more other monomeric vinyl compounds, in the presence of one or more other polymeric substances. The free radicals formed during the polymerisation process react with the polymeric substance and this brings about a chemical combination of the newly formed polymer and the polymeric substance already present. Grafted acrylonitrile polymers cannot be separated into their constituent parts by physical methods, because the two or more polymeric materials are chemically combined. The manufacture of grafted acrylonitrile polymers is described and claimed in co-pending application Serial No. 234,442, filed June 29, 1951, and the two divisional applications thereof, namely Serial Nos. 370,601 and 370,602, filed July 27, 1953.

Grafted acrylonitrile polymers can be spun into fibres which, while retaining the good properties ascribed to fibres obtained from acrylonitrile polymers, have the great advantage of enhanced dye receptivity. For use in the making of fibres, those grafted acrylonitrile polymers obtained by polymerising at least 85 parts by weight of acrylonitrile with not more than 15 parts by weight of any other monomeric vinyl compound or compounds are preferred. It is also preferred that the polymeric substance should be water soluble, have a molecular weight greater than 1000, and that the amount present should be between 5 and 40% by weight of the grafted acrylonitrile polymer.

The use of ethylene carbonate as a solvent for polymers of acrylonitrile is known. We have found that ethylene carbonate/water mixtures are excellent solvents for grafted acrylonitrile polymers.

According to the present invention we provide new and improved compositions comprising a grafted acrylonitrile polymer, ethylene carbonate and water.

The present invention also comprises the production of shaped articles of the grafted acrylonitrile polymers, from such compositions.

To obtain solutions having a polymer concentration sufficiently high for spinning into fibres or casting into films, it is necessary to have an excess of ethylene carbonate present, preferably more than 60% by weight.

In the spinning of fibres from the composition of this invention usual coagulative spinning processes are used. The coagulating bath may comprise any suitable liquid such as an aliphatic dihydric alcohol or a metal salt solution, but water is preferred because of its availability, cheapness and the excellent results obtained. It will be appreciated that as spinning proceeds ethylene carbonate will collect in the bath and after a time, particularly if the bath is heated, a little ethylene glycol will be present as a result of decomposition of the ethylene carbonate.

It is preferred that the ethylene carbonate content of the bath should be kept substantially constant.

The fact that mixtures of ethylene carbonate and water can be used enables solutions of the grafted polymers for spinning or casting to be made up without it being necessary for the polymer to be carefully dried. When adding the solvent, allowance can be made for the water content of the polymer. Neither does the ethylene carbonate used have to be in the anhydrous state, provided allowance is made for the water-content. This is an advantage when using recovered ethylene carbonate. As a considerable proportion of water can be used, our invention makes a very great contribution to the economic spinning of fibres from grafted acrylonitrile polymers.

The following examples, in which all parts are by weight, illustrate, but do not limit, the scope of our invention.

*Example 1*

A slurry of 32 parts of a grafted acrylonitrile polymer containing 15% of 80% hydrolysed polyvinyl acetate and 85 parts polyacrylonitrile, 220 parts ethylene carbonate and 0.2 part salicylic acid was heated and stirred at 95°–100° C. for one hour. At the end of this time the mixture was a turbid heterogeneous solution having a viscosity at 100° C. (as measured by the falling sphere method) greater than 1,000 poises.

The same operation was repeated using a mixture of ethylene carbonate (180 parts) and water (40 parts) in place of the ethylene carbonate alone. A clear colourless homogeneous solution was obtained having a viscosity at 97°–98° C. of 100 poises and a viscosity at 80° C. of 205 poises. Continued heating of this solution at 80° C. for 60 hours produced only a minor change in viscosity.

From this example it can be seen that the solution in the ethylene carbonate/water mixture is more suitable for spinning than that in ethylene carbonate alone.

*Example 2*

A solution in ethylene carbonate was prepared using a graft interpolymer consisting of 76.5 parts acrylonitrile, 8.5 parts 2-vinyl pyridine and 15 parts polyvinylalcohol (the latter being 76% hydrolysed polyvinylacetate). 4 parts of the dry, powdered interpolymer were sprinkled into 41.2 parts of ethylene carbonate at 45° C. while vigorously stirring, to which had been previously added 0.08 parts of salicylic acid. The slurry was well homogenised by continuing to stir at this temperature for half an hour after polymer-addition was complete. The slurry was then heated to 95° C. and maintained at this temperature for half an hour while continuing to stir. The solution thus formed was transferred to a viscosity tube maintained at 88° C. by means of a vapour jacket and gave a falling-sphere viscosity of 54 poises at 88° C.

Four parts of the same graft interpolymer sample were sprinkled into a mixed solvent consisting of 28.8 parts ethylene carbonate, 7.2 parts water plus 0.07 parts salicylic acid at 25° C., and the same dissolving procedure adopted. This solution gave a falling sphere viscosity value of 162 poises at 88° C.

*Example 3*

The following composition was used to make a solution of a grafted interpolymer consisting of 76.5 parts acrylonitrile, 8.5 parts methyl methacrylate and 15 parts polyvinyl alcohol (the latter being 76% hydrolysed polyvinylacetate):

| | Parts |
|---|---|
| Polymer | 3.5 |
| Ethylene carbonate | 28.3 |
| Salicyclic acid | 0.06 |

The solution was mixed as for Example 2 and gave a viscosity value by the falling-sphere method of 47.5 poises at 88° C.

The same interpolymer was used in the following composition slurried at 25° C.:

| | Parts |
|---|---|
| Polymer | 3.5 |
| Ethylene carbonate | 20.6 |
| Water | 5.1 |
| Salicyclic acid | 0.06 |

The resultant solution had a viscosity of 318 poises at 88° C.

*Example 4*

A four-component graft interpolymer consisting of 75 parts acrylonitrile, 7.5 parts methyl methacrylate, 7.5 parts vinyl acetate and 10 parts polyvinyl alcohol (76% hydrolysed polyvinyl acetate) was made into a solution from the following composition:

| | Parts |
|---|---|
| Polymer | 6 |
| Ethylene carbonate | 60.6 |
| Salicylic acid | 0.13 | by mixing as described for Example 2. The viscosity was 63 poises at 88° C.

The same four component graft interpolymer was made into a solution of the following composition:

| | Parts |
|---|---|
| Polymer | 6 |
| Ethylene carbonate | 43.2 |
| Water | 10.8 |
| Salicylic acid | 0.11 | using the mixing process of Example 2. The resultant solution had a viscosity of 110 poises at 88° C.

*Example 5*

A grafted polymer comprising 81.5 acrylonitrile and 18.5 cellulose methyl ether was made into a solution from the following mixture:

| | Parts |
|---|---|
| Polymer | 6 |
| Ethylene carbonate | 60.6 |
| Salicylic acid | 0.13 | using the mixing process of Example 2. The solution had a viscosity of 290 poises at 88° C.

Another solution was made from the same grafted polymer:

| | Parts |
|---|---|
| Polymer | 6 |
| Ethylene carbonate | 43.2 |
| Water | 10.8 |
| Salicylic acid | 0.11 | and mixed as above, except that slurrying was at 25° C. instead of 45° C. The viscosity was 365 poises at 88° C.

Examples 2 to 5 show that grafted acrylonitrile polymers can be dissolved to form useful solutions e. g. for spinning in an ethylene carbonate/water mixture and that such solutions are in no way inferior to those in ethylene carbonate alone, using approximately the same polymer/solvent ratio. This means that a considerable saving can be made in the cost of the solvent used in, for example, a commercial spinning process and also, since less ethylene carbonate is used, that the amount of time and money spent on solvent recovery is reduced considerably.

*Example 6*

A grafted polymer containing 85 parts acrylonitrile and 15 parts polyvinylalcohol (76% hydrolysed polyvinyl acetate) was mixed as follows. 42 parts of the dry polymer powder were mixed with 51.6 parts water at room temperature. Ethylene carbonate, 206–4 parts, and salicylic acid, 0.41 part, were heated to 70° C. and stirred vigorously. The wet polymer powder was introduced into the hot ethylene carbonate to form a solution which was heated to 95° C. in 20 minutes, and stirred for ½ hour at 95°–100° C. The solution was transferred to a viscosity tube and cooled to 88° C. and gave a viscosity value of 72 poises at 88° C. There was no apparent difference between this solution and others mixed by first forming a slurry in the cold and then heating; it being clear and homogeneous.

This example shows that using the compositions of our invention a solution can be made without the necessity of mixing polymer and solvent in the cold to form a slurry and then heating to form a solution.

*Example 7*

168 parts of a grafted polymer consisting of polyacrylonitrile (85%) and 80% hydrolysed polyvinyl acetate (15%), were dissolved in 1200 parts of a solvent mixture consisting of 75% ethylene carbonate and 25% water with 1 part of salicylic acid added as ethylene carbonate stabilizer. This was done by introducing the dry powdered polymer slowly into the solvent mixture at 25°–30° C. while rapidly stirring, heating the slurry to 95–100° C. and maintaining the solution at 90° C. for about half an hour. The solution was filtered and extruded through a 40 hole 0.100 mm. platinum alloy spinneret at 85° C. into a fresh water bath at 85° C. at a rate of 16.5 gm./min. (jet velocity about 146 ft./min.). The yarn was held under a tension of 50 gms. by means of vertical guides situated 2 ft. away from the spinneret face and travelled a total of 4 ft. in the spinning bath. It was then led over guides to a capstan/separator roll system on which it was wound to form several helices before it was collected on a perforated metal bobbin. The wind-up speed was 72 ft./min. The yarn was washed in running hot water at 55–65° C. It was then allowed to drain, dried continuously on a hot roll/separator roll system at 165° C. and 15 ft./min. and drawn to 7.5 times its original length, from the hot roll through a slot in a 12″ plate heated to 165° C. The drawn yarn was wound several turns round a capstan/separator roll system and on to a perforated metal bobbin. It had a denier of 111, a tenacity of 3.6 gm./den. and an elongation at break of 6.6%. The same yarn after relaxing 15% at 180° C. had a denier of 126, tenacity 2.9 gm./denier and elongation 14%.

*Example 8*

A grafted polymer containing 85% of polyacrylonitrile and 15% of 80% hydrolysed polyvinyl acetate was made by polymerisation in aqueous medium. The polymer slurry from the polymerisation was washed with water until free from inorganic salts and substantially free from unreacted partially hydrolysed polyvinyl acetate. The filter cake was then centrifuged.

The water content of the above polymer was estimated gravimetrically and found to be 47.2% of the total weight. This water was taken into account when mixing a solution of final composition, 12% of powder, in 88% of a solvent consisting of 80/20 ethylene carbonate/water and 0.1% salicylic acid. The solution was prepared as in Example 7; filtered and extruded at 87° C. through a 60 hole 0.075 mm. platinum alloy spinneret at 35 gm./min. into a water bath containing 2% cetyl alcohol-ethylene oxide condensate at 86° C. After a bath travel of 4 ft. the yarn was collected as described in Example 7, but without using tension guides at 2 ft. from the spinneret, at a wind-up speed of 134 ft./min. and under a 25 gm. tension. The yarn after washing, and draining free of surplus water, was dried over a hot roll/separator roll system at 160° C. and drawn to twice its length from the end of the roll, led round a capstan/separator roll system several times and collected on a perforated metal bobbin. The yarn was then drawn to three times its length through a heated slot at 160° C. to give a product having a denier of 176, a tenacity of 2.8 gm./denier and elongation 6.6%. The same drawn yarn, relaxed 10% at 180° C. had a denier of 197, tenacity 2.5 gms./denier and elongation 10.5%.

Examples 7 and 8 illustrate the spinning of artificial yarns from the compositions of our invention.

We have found when making a spinning solution using the compositions of our invention that better results are obtained if the solution is homogenised by heating, preferably at 95 to 100° C., for half an hour or more while stirring. This process step makes the solution more stable, in that the viscosity remains constant and there is less likelihood of the polymer separating out.

What we claim is:

1. A composition comprising a grafted acrylonitrile polymer, ethylene carbonate and water, wherein the ethylene carbonate is in excess of the water on a weight basis, said grafted acrylonitrile polymer being obtained by polymerizing from about 85 to 100 parts by weight of acrylonitrile with from 0 to 15 parts by weight of at least one other monomeric vinyl compound in the presence of a polymer which is water soluble, has a molecular weight greater than 1000, and is present in an amount between 5 and 40% by weight of the grated polymer.

2. A composition according to claim 1 wherein the acrylonitrile is polymerized in the presence of partially hydrolyzed polyvinyl acetate but in the absence of other monomeric vinyl compounds.

3. A composition according to claim 1 wherein the grafted acrylonitrile polymer is made by polymerizing at least 85 parts by weight of acrylonitrile and not more than 15 parts by weight of at least one monomeric vinyl compound, having a functionality of two, in the presence of partially hydrolized polyvinyl acetate.

4. A composition according to claim 10 wherein the partially hydrolized polyvinyl acetate of the grafted acrylonitrile polymer is water soluble.

5. A composition according to claim 10 wherein the molecular weight of the polyvinyl acetate of the grafted acrylonitrile polymer is greater than 1,000.

6. A composition according to claim 1 wherein the grafted acrylonitrile polymer contains from 5 to 40% by weight of partially hydrolized polyvinyl acetate.

7. A composition according to claim 1 wherein the ethylene carbonate is present in an amount greater than 60% by weight based on the total weight of ethylene carbonate and water present.

8. A process for making the composition of claim 1 wherein said grafted acrylonitrile polymer is just mixed with water and the resulting mixture dissolved in hot ethylene carbonate.

9. The process of claim 8 wherein the solution is homogenized by heating for at least half-an-hour, at a temperature of 95 to 100° C. while stirring.

10. A composition according to claim 1 wherein the acrylonitrile is polymerized in the presence of partially hydrolyzed polyvinyl acetate.

References Cited in the file of this patent

UNITED STATES PATENTS 2,649,434   Coover et al. _____ Aug. 18, 1953